A. JOHNSTON.
Ruffling Attachment for Sewing-Machines.
No. 5,070. Reissued Sep. 24, 1872.
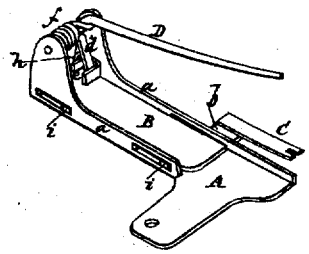
Witnesses
C. B. Wottingham
A. Moore
Inventor
Allen Johnston
by atty A. Collins
A.M. PHOTO-LITHOGRAPHIC CO. N.Y. (OSBORNE'S PROCESS.)

UNITED STATES PATENT OFFICE.

ALLEN JOHNSTON, OF OTTUMWA, IOWA, ASSIGNOR TO THE JOHNSTON RUFFLER COMPANY, OF SAME PLACE.

IMPROVEMENT IN RUFFLING ATTACHMENTS FOR SEWING-MACHINES.

Specification forming part of Letters Patent No. 108,486, dated October 18, 1870; reissue No. 5,052 dated September 10, 1872; reissue No. 5,070, dated September 24, 1872.

*To all whom it may concern:*

Be it known that I, ALLEN JOHNSTON, of Ottumwa, Wapello county, Iowa, have invented certain new and useful Improvements in Gathering and Ruffling Attachments for Sewing-Machines, of which the following is a specification:

This invention relates to that class of ruffling and gathering attachments in which a reciprocating gathering-blade, or the gatherer proper, is actuated from or by the needle-arm or bar, through the intermediary of a vibratory lever.

The improvements herein comprised refer to the device which makes the gather and operates directly on the goods, which I shall call the gatherer proper; and to the mode of connecting the vibratory lever with said gatherer, in order to readily adjust the length of movement of the gatherer for the purpose of regulating the fullness of the gathers.

The invention consists, first, in the combination, in a gathering and ruffling attachment for sewing-machines, of a frame, a vibratory lever arranged to be operated from or by the needle-arm, and a reciprocating gathering-blade actuated by said lever, having its front end slotted and bent or turned upward, and arranged to operate in connection with the presser-foot of the sewing-machine, substantially as hereinafter described; secondly, in the combination, with the reciprocating gathering blade or plate, or gatherer proper, of a vibratory lever for actuating the same, pivoted to the frame of the attachment and having one of its arms working loosely in a recess or slot in said gatherer, and an adjusting device whereby the lost motion of said arm in said recess or slot may be increased or decreased to regulate the length of movement of the gatherer, substantially as hereinafter described; thirdly, in the construction and arrangement of the reciprocating gathering-blade, as hereinafter described, whereby its slotted edge or end, which takes hold of the goods, is turned or inclined upward away from the cloth-plate of the machine and toward the surface against or toward which it must work in making the gathers.

To enable those skilled in the art to understand and use these improvements, I will proceed to describe the manner in which the same are or may be carried into effect, by reference to the accompanying drawing, which represents a perspective view of an attachment made in accordance with my invention.

The several parts of the attachment are carried by a frame or bed-plate, A, on which the plate B, to which the gathering-blade C is attached, is held in such manner as to be capable of sliding longitudinally to and fro. For this purpose the edges *a a* of the plate A are turned up to form guides between which the sliding gatherer plate B moves; and the latter plate has pins *i* on its sides which project into slots formed in the turned-up parts *a*, as shown. An arm, *b*, projects from one side of the plate B and through a slot in one of the ledges *a* of the bed-plate A, and carries a gathering-blade or spring, C, the forward end of which is slotted to permit the passage of the needle. The point or end of the blade is curved or bent upward and is designed to work against the face of presser-foot of the sewing-machine. The material to be operated on passes over the gathering-blade and under the presser-foot; the upward bend of the end of the blade insures its taking hold of the goods above it.

In order to actuate the sliding reciprocatory gatherer, I employ an angle or elbow-lever, consisting of the two arms *d* D and working on a pivot which has its bearing in standards on the frame or bed-plate A, as shown. The lower end of the arm *d* projects into a slot or recess, *e*, with which the sliding plate B is provided, and the slot or recess is of such length as to allow the arm *d* when vibrated to move some distance in one direction or the other without actuating the sliding plate. This motion of the arm *d* of the lever I term the "lost motion," as during its continuance the plate B remains at rest. To regulate the amount of lost motion of the lever in the slot or recess *e* I provide an adjusting-screw, *h*, in the rear end of the recess, which can be turned to project more or less into the recess, and will thus serve to correspondingly limit the lost motion of the lever-arm *d*. When the screw is withdrawn entirely from the recess the lever will have its maximum play independently of the gathering-plate, and consequently the latter will have little or no motion. According to the distance the screw projects into the recess the lost motion of the lever-arm will be limited, and the length of reciprocation of the gatherer will be adjusted to regulate the fullness of the gathers. A spring, *f*, surrounds the pivot of the lever, and bears against the under side of the arm D of the lever in order to raise it. This arm is intended to be struck by the descending needle-bar, and the spring *f* serves to raise it when the needle-bar rises, so as to again bring it into position, and also to advance the gatherer. If two pieces of goods are to be sewn together, only one of which it is desired to ruffle, the piece to be ruffled is placed above the blade C and drawn under the presser-foot of the machine, while the other piece passes beneath the blade as well as under the presser-foot. When the machine is in motion the needle-bar, as it descends, bears upon and carries down the bar D, which draws back the blade C, the goods being held down by the presser-foot. When the needle-bar rises the recoil of spring *f* raises the arm D of the lever and causes the other arm, *d*, to push forward the blade C, which catches the material above it, pushes it forward under and against the presser-foot, and makes the gather. The blade, being bent upward, is enabled to catch and move forward the goods without difficulty. Upon descent again of the needle-bar the gathering-blade moves back, but not until the needle enters the cloth, while the presser-foot holds the gather already made; and the needle passes down through the gathered strip as well as the ungathered strip below it, secures the gather, and sews the two strips together. The fullness of the gathers is regulated as hereinbefore described.

By forming and arranging the gathering-blade so that its slotted end or edge which gathers the goods shall incline upward away from the cloth-plate and toward the upper stationary surface—the presser-foot in this instance—against which the blade should work in making the gathers, I am enabled to have the gathering-blade reciprocate in a right line and parallel with and close to the cloth-plate without danger of gathering the one of the two pieces of goods which, in the above description of the operation of the attachment, is supposed to pass beneath the gathering-blade. The gathering-blade can travel back and forth in contact with the under piece, and yet, owing to the fact that its slotted edge, which takes hold of the goods, is inclined upward away from the cloth-plate and toward the stationary surface under which the strip to be gathered passes, it will not take hold of nor operate in any way upon said under piece.

Having now described my invention and the manner in which the same is or may be carried into effect, what I claim, and desire to secure by Letters Patent, is—

1. The combination, with a supporting-frame and a vibratory lever, arranged to be operated from or by the needle bar or arm, of a reciprocating gathering-blade, connected with and actuated by said lever, having its front end slotted and bent or turned upward, and arranged to operate in connection with the presser-foot of the sewing-machine, substantially as herein shown and described.

2. The combination, with the reciprocating gatherer proper, of a vibratory lever for actuating the same, pivoted to the frame of the attachment, and having one of its arms working loosely in a recess or slot in said gatherer, and an adjusting device, whereby the lost motion of the said arm in said slot or recess may be increased or decreased at pleasure to regulate the length of reciprocation of the gatherer, substantially as and for the purposes set forth.

3. In a gathering and ruffling attachment in which the material to be gathered is required to pass above the reciprocating gathering-blade and between it and an upper stationary surface, against which the blade works in forming the gathers, I claim a gathering-blade, slotted for the passage of the needle and turned or inclined upward so that its slotted edge, which takes hold of the stuff to be gathered, shall incline upward away from the cloth-plate of the machine, to which the attachment may be applied, substantially as and for the purposes set forth.

In testimony whereof I have hereunto set my hand in the presence of two subscribing witnesses.

ALLEN JOHNSTON.

Witnesses:
J. S. PAINTER,
THOMAS K. SHEPHARD.